June 14, 1949.                A. J. CONN ET AL                2,473,093
                                MACHINE TOOL
                          Original Filed Nov. 22, 1943
Fig-1-
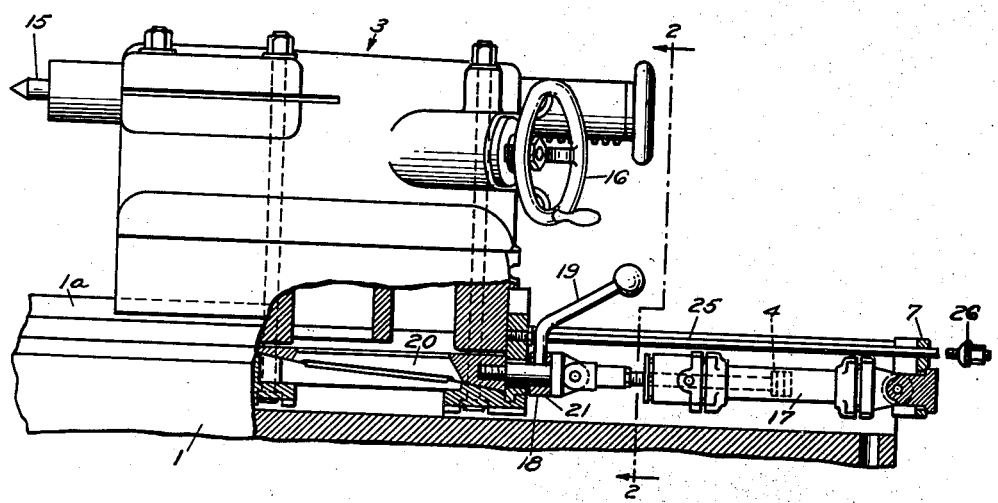
Fig-2-
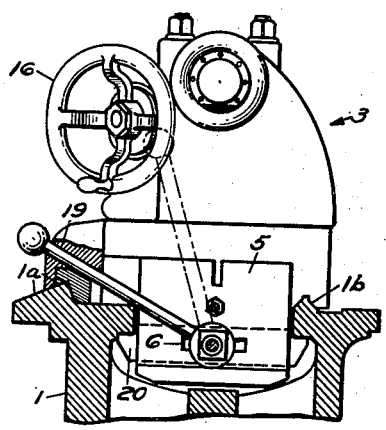
Fig-3-
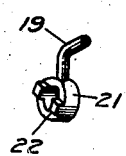
Inventor
ALFRED J. CONN
AND
RICHARD B. STANLEY
By J. H. Church + H. E. Thibodeau
Attorneys Patented June 14, 1949

2,473,093

UNITED STATES PATENT OFFICE 2,473,093

MACHINE TOOL

Alfred J. Conn, Oak Park, and Richard B. Stanley, Maywood, Ill., assignors to La Salle Designing Company, Chicago, Ill., a partnership composed of Alfred J. Conn and Martha Conn Original application November 22, 1943, Serial No. 511,298, now Patent No. 2,399,594, dated April 30, 1946. Divided and this application January 24, 1946, Serial No. 643,124

2 Claims. (Cl. 82—31)

This invention relates to a tailstock for a lathe type machine tool and particularly to an improved hydraulic mechanism for operating the tailstock.

This application constitutes a division of our co-pending application, Serial No. 511,298, filed November 22, 1943, and now Patent No. 2,399,594, granted April 30, 1946.

An object of this invention is to provide a hydraulic operating mechanism for the tailstock of a lathe type machine tool which will selectively move the tailstock along the lathe bed or clamp it to the bed in any selected position thereon.

The specific nature of the invention, as well as other objects and advantages thereof, will clearly appear from a description of a preferred embodiment as shown in the accompanying drawings in which:

Fig. 1 is a side elevational view, partly in section, of a tailstock for a lathe type machine tool embodying this invention.

Fig. 2 is a sectional view taken along the plane 2—2 of Fig. 1.

Fig. 3 is an isometric view of the operating collar.

A tailstock 3 is mounted on the ways 1a and 1b of the bed 1 of a lathe type machine tool, such for example as that shown in our above-referred-to co-pending application. The tailstock per se forms no part of this invention and may be any of several well known types, including a longitudinally adjustable center 15 and a hand-wheel 16 for accomplishing longitudinal positioning of the center 15.

The tailstock 3 is moved along the lathe bed 1 to and from a work supporting position by a double acting hydraulic motor 17 suitably mounted to lathe bed 1 which is properly supplied with hydraulic fluid for desired direction of operation through a suitable foot operated valve (not shown). A wedge-shaped recess is provided in the base of tailstock 3 and accommodates a wedge 20 which when forced between the tailstock base and the lathe bed 1, locks the tailstock rigidly to the lathe bed.

The operating piston 4 of hydraulic motor 17 is selectively connected to the rear of tailstock 3 or operatively connected to wedge 20 in a manner which will be described. The operating piston 4 of hydraulic motor 17 is connected to the rear of tailstock 3 through a shaft-like member 18 threadably secured in the rear end of wedge 20. An integral rectangular projection 22 is provided on an operating collar 21 surrounding shaft 18. A plate 5 is secured to the rear of tailstock 3 and has a rectangular hole 6 therein through which shaft member 18 passes. Collar member 21 is rotatable by handle 19 between two positions which are angularly displaced by a substantial angle.

In one position the rectangular projection 22 on collar 21 is misaligned with respect to hole 6 and hence the force of hydraulic motor is applied to plate 5 to move tailstock 3 along the lathe bed to its work engaging position. Upon reaching such position the handle 19 is rotated to its other position where projection 22 is in alignment with hole 6. Then upon applying the hydraulic force of motor 17 the force will be transmitted to wedge 20, forcing it between tailstock 3 and the lathe bed and hence rigidly securing the tailstock to the bed 1. Thus all vibration of the tailstock is substantially eliminated.

To retract the tailstock, operation of the foot valve (not shown) reverses the fluid applied to motor 17. The shaft 18 being threaded into wedge 20 retracts the wedge and then the end of wedge 20 engages the inner surface of plate 5 and thus the entire tailstock is retracted.

If desired, a stop rod 25 may be provided. Such rod has one end secured to tailstock 3 and the other end passes through a bushing 7 secured to lathe bed 1. A stop 26 is adjustably secured to the extreme end of rod 25. Thus the movement of tailstock 3 in a work engaging direction may be limited according to location of stop 26 on rod 25.

We claim:

1. In a machine tool having a bed and a member slidably mounted on such bed, the improvement comprising a sliding wedge arranged to engage between said bed and said member, an operating rod secured to said wedge, hydraulic means operative to move said operating rod, a collar rotatably mounted between two positions on said rod, and a projection on said collar engageable with said member and arranged to maintain said wedge out of engagement with said member in one such rotative position of said collar whereby said hydraulic means may advance said member along the bed and in the other position of said collar to disengage said rod from said member whereby said hydraulic means may advance said wedge with respect to said member to lock said member to the bed.

2. In a machine tool having a bed and a tailstock slidably mounted on such bed, the improvement comprising a wedge slidably mounted in the rear portion of the tailstock, said wedge arranged to engage between the tailstock and the bed, an operating rod secured to said wedge, a hydraulic cylinder mounted on the bed and connected to said rod whereby said wedge may be advanced or retracted with respect to said tailstock, a collar mounted on said rod adjacent the rear end of the tailstock, a handle connected to said collar and arranged to rotate said collar between two positions, and projections on said collar arranged to abut against the rear portion of the tailstock in one of such positions and to clear the tailstock in the other position whereby said hydraulic cylinder may be selectively utilized to advance the tailstock along the bed or to advance said wedge with respect to the tailstock to lock said tailstock to the bed.

ALFRED J. CONN.
RICHARD B. STANLEY.

REFERENCES CITED

The following references are of record in the file of this patent:

UNITED STATES PATENTS

| Number | Name | Date |
|---|---|---|
| 1,010,616 | Gottschalk | Dec. 5, 1911 |
| 1,035,784 | Greenleaf | Aug. 13, 1912 |
| 1,327,356 | Putnam | Jan. 6, 1920 |